United States Patent
Wang et al.

(10) Patent No.: US 7,339,289 B2
(45) Date of Patent: Mar. 4, 2008

(54) SYNCHRONOUS PERMANENT MAGNET PLANAR MOTOR

(75) Inventors: Jinsong Wang, Beijing (CN); Yu Zhu, Beijing (CN); Jiayong Cao, Beijing (CN); Wensheng Yin, Beijing (CN); Guanghong Duan, Beijing (CN)

(73) Assignees: Tsinghua University, Beijing (HK); Shanghai MicroElectronics Equipment Co., Ltd., Shanghai (HK)

( * ) Notice: Subject to any disclaimer, the term of this patent is extended or adjusted under 35 U.S.C. 154(b) by 0 days.

(21) Appl. No.: 11/207,425

(22) Filed: Aug. 19, 2005

(65) Prior Publication Data

US 2006/0049699 A1 Mar. 9, 2006

(30) Foreign Application Priority Data

Aug. 20, 2004 (CN) .................... 2004 1 0009472

(51) Int. Cl.
*H20K 41/00* (2006.01)
(52) U.S. Cl. ............... 310/12; 310/13; 310/15
(58) Field of Classification Search ................ 310/12, 310/13, 15
See application file for complete search history.

(56) References Cited

U.S. PATENT DOCUMENTS

| | | | | |
|---|---|---|---|---|
| 4,563,602 A * | 1/1986 | Nagasaka | ..................... | 310/12 |
| 4,945,268 A * | 7/1990 | Nihei et al. | ..................... | 310/12 |
| 5,138,206 A * | 8/1992 | Schmidt | ..................... | 310/12 |
| 5,352,946 A * | 10/1994 | Hoffman et al. | ............... | 310/12 |
| 6,144,118 A * | 11/2000 | Cahill et al. | ................... | 310/12 |
| 6,236,124 B1 * | 5/2001 | Sekiyama et al. | ............ | 310/12 |
| 6,339,266 B1 * | 1/2002 | Tanaka | ......................... | 310/12 |
| 6,703,726 B2 * | 3/2004 | Itoh et al. | ..................... | 310/12 |
| 6,835,941 B1 * | 12/2004 | Tanaka | ..................... | 250/491.1 |
| 6,864,602 B2 * | 3/2005 | Korenaga | ..................... | 310/12 |
| 6,927,505 B2 * | 8/2005 | Binnard et al. | ............... | 310/12 |

OTHER PUBLICATIONS

Han-Sam Cho and Hyun-Kyo Jung, Analysis and Design of Synchronous Permanent-Magnet Planar Motors, IEEE Transactions of Energy Conversion, vol. 17, No. 4, Dec. 2002.

Ir. J.C. Compter, Electro-dynamic planar motor, Department of Mechanical Engineering, Section Precision Engineering, Technical University Eindhoven, Eindhoven, The Netherlands, Aug. 13, 2003, Science Direct, Precision Engineering 28 (2004) 171-180, available at www.sciencedirect.com.

(Continued)

*Primary Examiner*—Darren Schuberg
*Assistant Examiner*—Iraj A. Mohandesi
(74) *Attorney, Agent, or Firm*—Michael Best & Friedrich LLP

(57) ABSTRACT

According to the invention, configurations of X-windings and Y-windings in a synchronous permanent planar motor are improved, X-windings and Y-windings overlap in the direction normal to the planar magnet array and distribute on the entire surface of the thrust core, such that effective wires in the X-windings and Y-windings are lengthened and increased in number, therefore the electromagnetic force generated by the SPMPM of this invention is increased correspondingly; X-windings and Y-windings are mounted on a thrust core made of iron material, thus the electromagnetic force is further increased; in addition, two separated anti-yawing member are provided on the mover for counteracting yawing of the mover, accordingly interference between anti-yawing torque and the electromagnetic force for propelling is eliminated.

8 Claims, 6 Drawing Sheets

OTHER PUBLICATIONS

Wei Gao, Shuichi Dejima, Hiroaki Yanai, Kei Katakura, Satoshi Kiyono, Yoshiyuki Tomita, A surface motor-driven planar motion stage integrated with an XY0z surface encoder for precision positioning; Department of Mechatronics and Prevision Engineering, Tohoku University, Tokyo, Japan; Science Direct, Precision Engineering 28 (2004) 329-337, available at www.sciencedirect.com.

Mike Holmes, Robert Hocken, David Trumper, The long-range scanning stage: a novel platform for scanned-probe microscopy; Center for Precision Metrology, University of North Carolina, Charlotte, NC, Jun. 22, 1999, Precision Engineering, Journal of the International Societies for Precision Engineering and Nanotechnology 24 (2000) 191-209.

* cited by examiner

US 7,339,289 B2

SYNCHRONOUS PERMANENT MAGNET PLANAR MOTOR

RELATED APPLICATION DATA

This application claims priority under 35 U.S.C. § 119 to Chinese Patent Application No. 200410009472.X, filed on Aug. 20, 2004.

1. Field of the Invention

The invention relates to a planar motor, and more particularly, to a synchronous permanent magnet planar motor (SPMPM).

2. Background of the Invention

It's well known that a wire disposed in a magnetic field will create electromagnetic force (also referred to as Lorentz force) when carrying an electric current. In accordance with the Lorentz Law, the electromagnetic force F is given by:

$$F = N\, L\, B \times I \tag{1}$$

where N represents the number of wires, L the length of the wire, B the flux density, and I the electric current, the symbol "×" represents vector cross product multiplication.

A synchronous permanent magnet planar motor, which uses electromagnetic force F directly to propel a moving part, has the advantages of simplified structure, light weight and high positioning precision.

The previously proposed Synchronous permanent magnet planar motors comprise a planar magnet array having a plurality of magnets with magnetic fields of alternating polarity; and windings disposed in the magnetic field, which create electromagnetic force in cooperation with the magnetic field to propel a moving part when electronic currents flow through the windings.

FIG. 1 schematically shows a simplified configuration of a synchronous permanent magnet planar motor, which essentially comprises a mover 31 and a stator 32, wherein the mover 31 may move relative to the stator when in cooperation with the stator. On substrate 62 of the stator is disposed a planar magnet array 61 (FIG. 2), specifically, a plurality of upwardly polarized magnets and a plurality of downwardly polarized magnets are arranged alternatively on the substrate such that magnets in a same row/column all have the same polarity which is opposite to that of the magnets in immediate neighboring row/column. Such a configuration of magnets is similar to a chessboard pattern, and thus creates a magnetic field of periodic alternating polarity above the planar magnet array 61.

As shown in FIG. 3, conventionally X-windings for generating a electromagnetic force or a thrust in X direction and Y-windings for generating a thrust in Y direction are arranged separately on the bottom surface of the mover, wherein arrows 12, 13 respectively indicate one possible direction of electromagnetic forces generated by Y-windings and X-windings. Referring to FIGS. 1 and 4, the mover 31 is arranged so that its bottom surface is in parallel with the top surface of the stator, with a small gap therebetween. X-windings and Y-windings are provided on the bottom surface of the mover so as to be placed in the magnetic field of periodic alternating polarity generated by the magnet array.

FIG. 4 is a cross-sectional view showing a part of the configuration of a conventional SPMPM including magnets 102, 103 and 104, on which the arrows indicate the magnetic orientations of the magnet. Each magnet occupies an area having a lateral dimension of P, thus the magnet pitch, i.e., a distance between two adjacent magnets, is 2P. Wires in windings located above the magnet array for generating the desired electromagnetic force are called as effective wires, effective wires 105, 106 and 107 in X-windings being located directly above the magnets 102, 103 and 104 in the figure with a distance between two adjacent effective wires being equal to the magnetic moment. The symbol "×" on effective wires 105 and 107 indicates that an electric current flows in the Y direction into the plane of the figure, whereas the symbol "·" on the effective wire 106 indicates that an electric current flows in the −Y direction out of the plane of the figure. In accordance with Lorentz Law, the effective wires generate electromagnetic force in the X direction as indicated by arrows 109, and the mover shifts in the X direction accordingly. In the case where the electric currents are inverted in direction, the mover shifts in the opposite direction.

A SPMPM further comprises a servo-driver for supplying X-windings and Y-windings with sinusoidal alternating currents. FIG. 4 schematically shows in the lower portion a sinusoidal alternating current, which alternates over X or Y coordinate. Take the effective wire 105 as an example, as the Lorentz Law indicates, the effective wire 105 generates an electromagnetic force in the X direction as shown by the arrow 109 and moves to the right when being located above magnet 102; while moving to be above magnet 103, where the polarity of the magnetic field has been inverted, the electric current through the effective wire 105 is also inverted in direction, therefore the effective wire 105 still generates an electromagnetic force in the same direction, and keeps on moving in the X direction.

Alternatively, the above-described structure may be reversed, that is, the magnet array is used as the mover, while the X-windings and the Y-windings as the stator. The working principle for such a planar motor is similar to that of the above-mentioned one, and the description thereof is omitted.

In addition, the X-windings and the Y-windings also have an anti-yawing function in a conventional SPMPM. When the mover undesirably rotates around Z-axis due to disturbance, that is, yawing occurs, the servo-driver modulates the amplitudes of the electric currents supplied to the two X-windings or the two Y-windings shown in FIG. 3, such that the absolute values of the electromagnetic forces generated by the two X-windings or the two Y-windings differ from one another, resulting in a torque which drives the mover to rotate to counteract the yawing.

Conventional SPMPMs have a defect in that the generated electromagnetic forces are relatively small. Besides, a conventional SPMPM uses the same electromagnetic members, that is, the X-windings and Y-windings in FIG. 3, to generate both the electromagnetic forces and anti-yawing torque, such that there exists a coupling between the electromagnetic forces and anti-yawing torque, which results in difficulties in controlling the SPMPM with high precision.

SUMMARY OF THE INVENTION

According to one aspect of the invention, both the number and length of the effective wires in the X-windings and the Y-windings are increased without enlarging the volume of the mover or the stator on which the windings are mounted, and the X-windings and Y-windings overlap in the direction perpendicular to the magnet array, as a result, the electromagnetic force generated by the synchronous permanent magnetic planar motor ("SPMPM") is increased.

According to another aspect of the invention, X-windings and Y-windings are mounted on a core made of iron materials, so as to enhance the electromagnetic cooperation between the windings and the magnet array, which leads to further increase in the electromagnetic force generated by the SPMPM.

According to still another aspect of the invention, separated electromagnetic members are employed to create the electromagnetic force and anti-yawing torque respectively, and the separated electromagnetic members are provided in different areas on the bottom surface of a mover. With such a configuration, the coupling between the electromagnetic force and the anti-yawing torque may be avoided, and hence the SPMPM can be controlled with higher precision.

BRIEF DESCRIPTION OF THE DRAWINGS

Detailed descriptions will be given below to the present invention taken in conjunction with accompanying drawings, in which.

DETAILED DESCRIPTION

Figure 1:
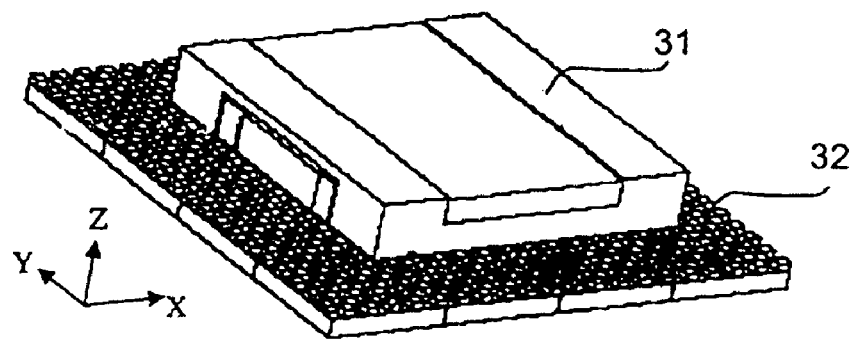
FIG. 1 is a perspective view showing the relative positions of a mover and a stator in a SPMPM.
Figure 2:
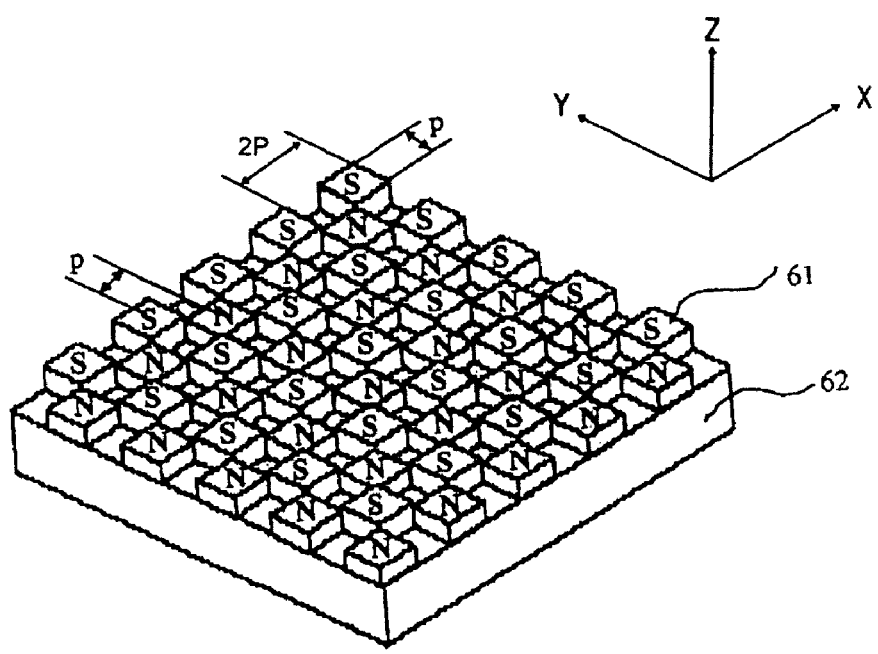
FIG. 2 schematically shows a magnet array of a SPMPM.
Figure 5:
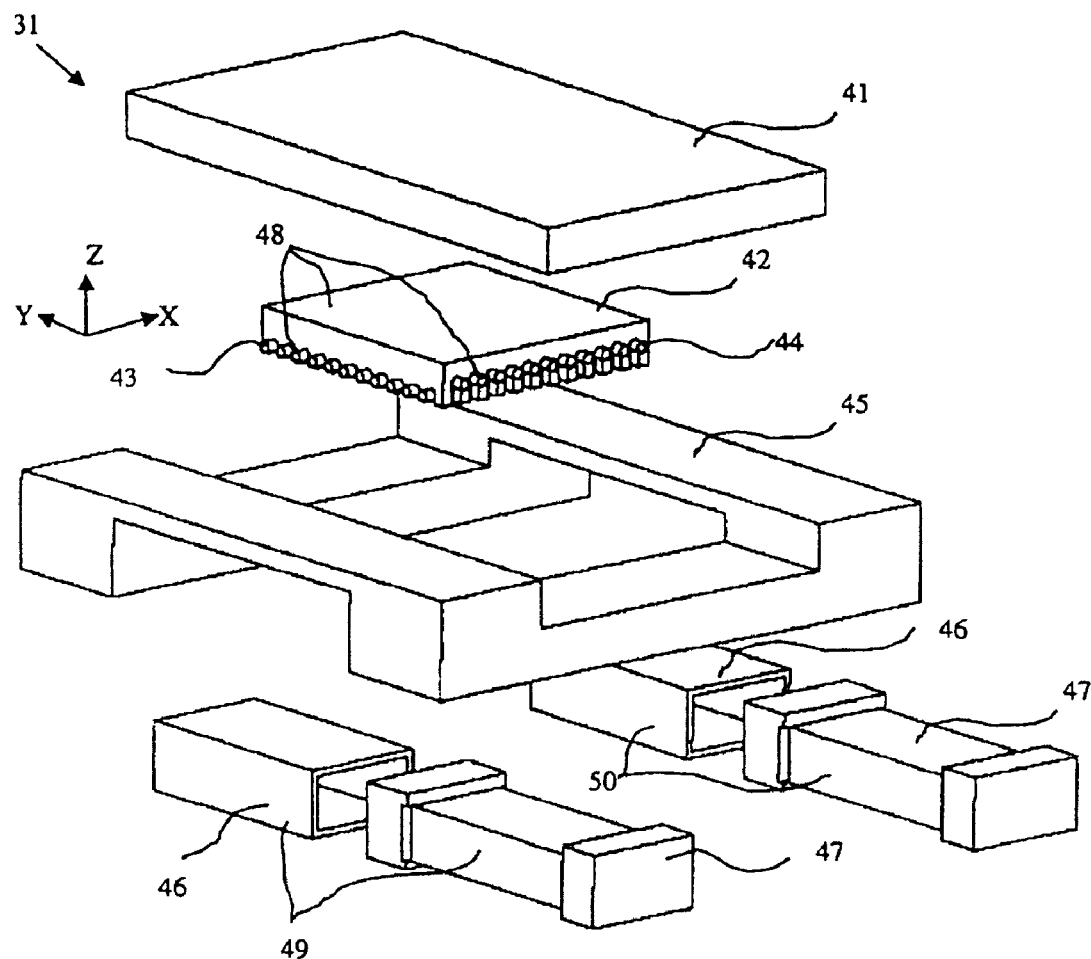
FIG. 5 shows the detailed structure of the mover according the invention.

According to an embodiment of the invention, a magnet array may be fixed on a substrate of a stator in a conventional manner (FIG. 2). X-windings and Y-windings are mount on a mover opposite to the stator. FIG. 5 shows the detailed configuration of a mover according to the invention. The mover comprises a thrust armature 48, two anti-yawing windings 46 and an anti-yawing windings core 47 on which the two anti-yawing windings 46 are mounted. The thrust armature 48 consists of X-windings 44, Y-windings 43 and thrust core 42 on which X-windings and Y-windings are mounted. The thrust armature 48 is attached to the base 45 of the mover via a connecting member 41.

Figure 6:
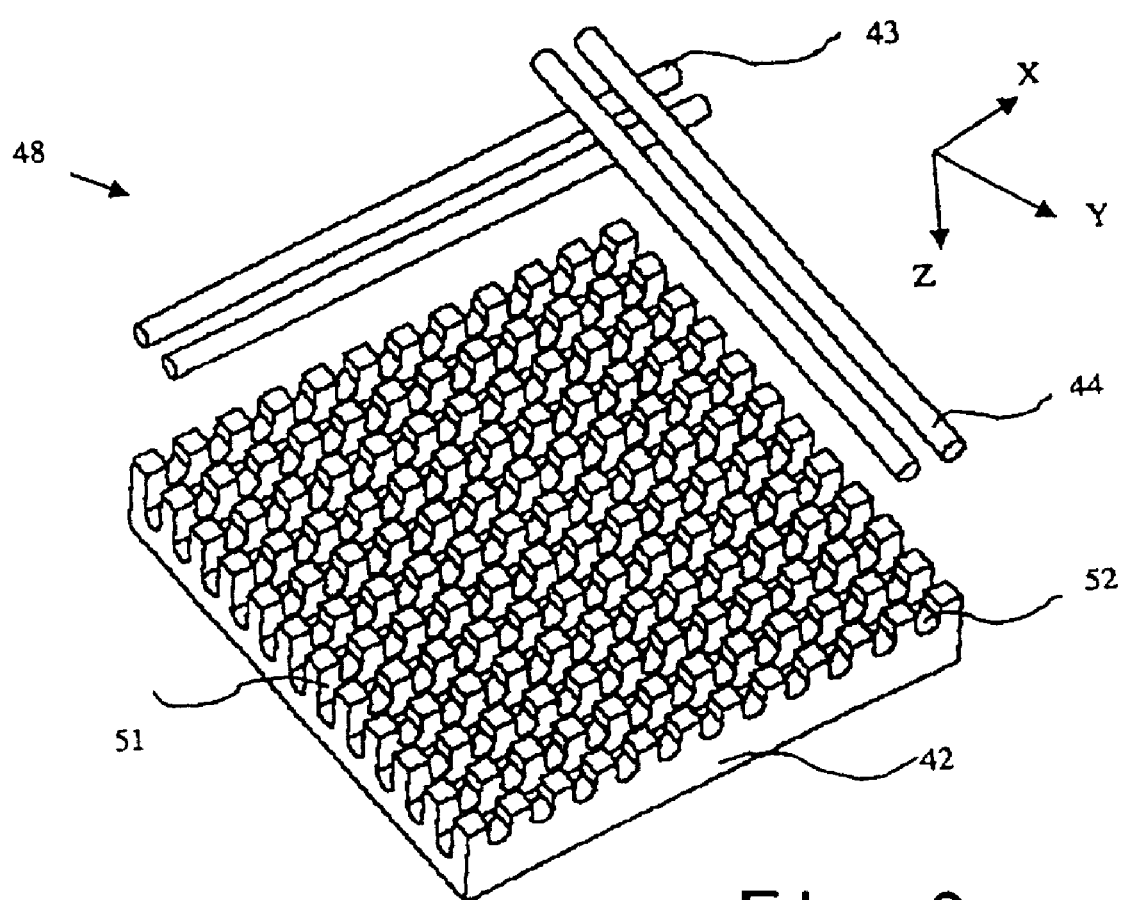
FIG. 6 shows the structure of the thrust core according to the invention along with X-windings and Y-windings to be mounted on the thrust core, wherein for clarity purpose, only two effective wires in each of the X-windings and Y-windings are shown.

Both X-windings and Y-windings are disposed in the full area on the bottom surface of the thrust core 42 of the mover, and in the direction normal to the bottom surface of the thrust core 42, i.e., in Z direction, Y-windings and X-windings overlaps. FIG. 6 is a perspective view of the mover along with X-windings 44 and Y-windings 43, wherein, for clarity purpose, the mover is turned upside down, and only two effective wires in each X-windings 44 and Y-windings 43 are shown. On the bottom surface of the thrust core 42, there are provided a plurality of paralleled grooves 51 oriented in the X direction and a plurality of paralleled grooves 512 oriented in the Y direction, in which the Y-windings 43 and the X-windings 44 are to be mounted respectively, such that the effective wires of X-windings extend perpendicular to those of Y-windings. Grooves 51 are made deeper than grooves 52 so as to have X-windings and Y-windings overlap in the full area of the bottom surface.

Figure 3:
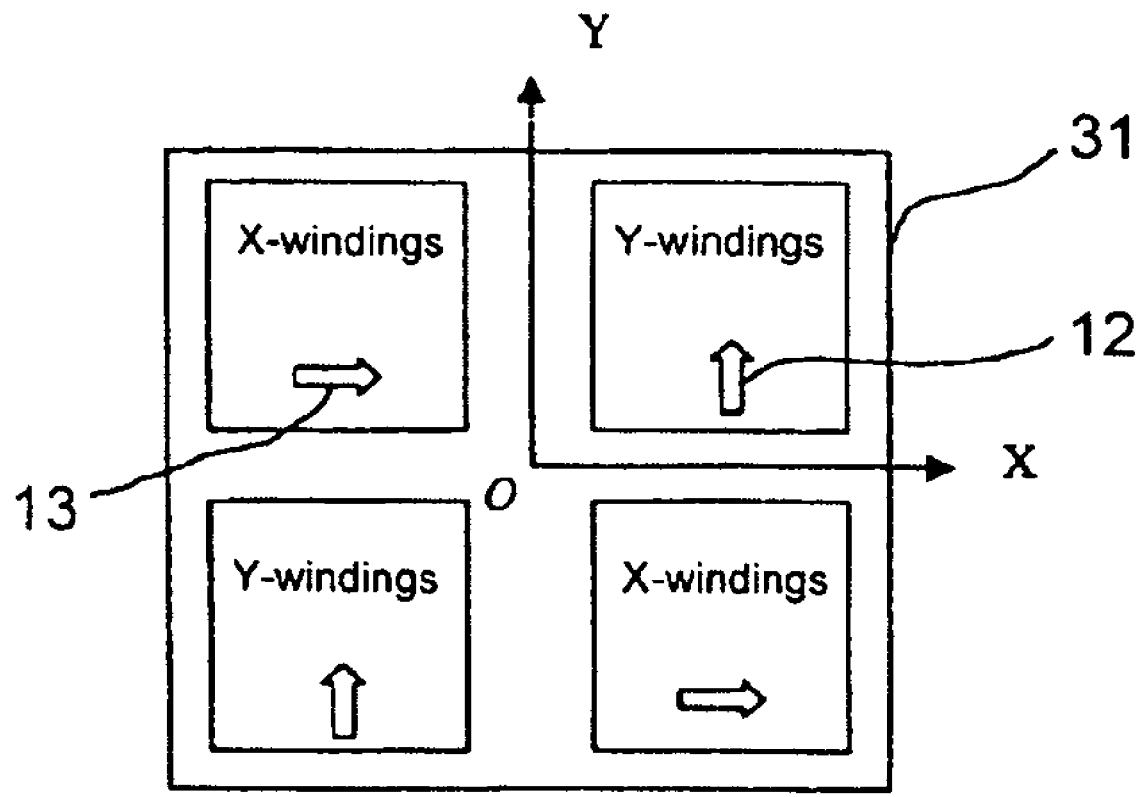
FIG. 3 shows the layout of X-windings and Y-windings on the bottom surface of a mover in a conventional SPMPM.
Figure 4:
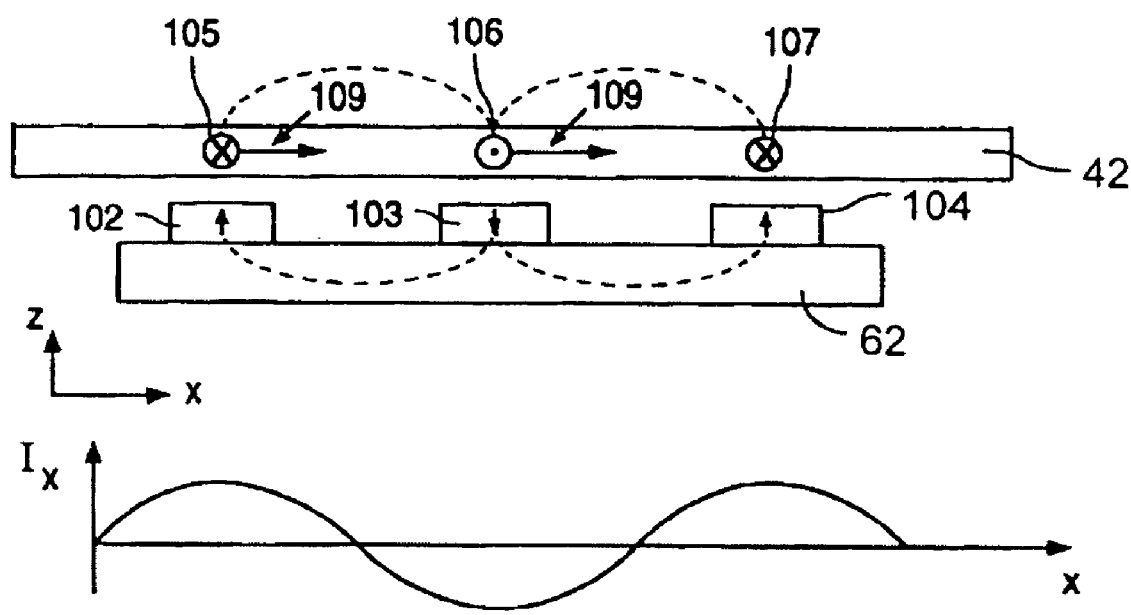
FIG. 4 is a cross-sectional view demonstrating the working principle of a SPMPM where the core for mounting windings is not made of iron materials and the windings are configured in single phase.

Compared with a conventional SPMPM as shown in FIG. 3, both the number and length of the effective wires in X-windings and Y-windings of the invention are increased, thereby the electromagnetic force generated by the SPMPM of the invention is increased.

Two separated anti-yawing members are provided for the mover of the invention as shown in FIG. 5. The first and second anti-yawing member 49 and 50 are rigidly and symmetrically fixed on two opposite sides on the bottom surface of the mover. The servo-driver supplies alternating electric currents to both of the two anti-yawing members in order that the two anti-yawing members generate equal forces in opposite directions respectively, so as to exert a torque on the mover to counteract the yawing.

To further improve the electromagnetic force generated by a SPMPM, the thrust core 42 is made of iron materials so as to enhance the strength of the magnetic field between the stator and the mover, and consequently the electromagnetic force generated by the SPMPM is increased.

In the above-described SPMPM, windings are arranged in single phase. The electromagnetic force reaches a maximum value when the effective wires of X-windings or Y-windings are located directly above a row or a column of magnets, and then goes down to zero gradually as the effective wires of X-windings or Y-windings become equidistant from two adjacent rows or two adjacent columns of magnets.

For a SPMPM of the invention to generate more even electromagnetic force to improve the positioning precision of the mover while generating larger electromagnetic force, a multi-phase configuration may be introduced into the embodiment described with FIG. 5.

U.S. Pat. No. 6,097,114 discloses a SPMPM where windings are arranged in 3-phase, which is hereby incorporated in its entirety by reference.

Figure 7:
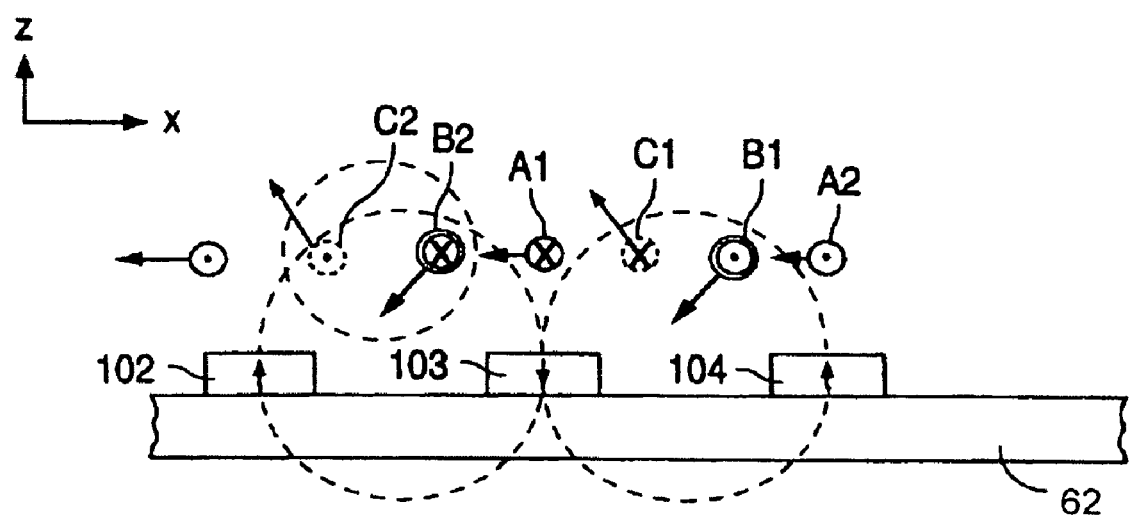
FIG. 7 is another cross-sectional view demonstrating the working principle of a SPMPM, where the windings are configured in 3-phase.

When the windings of the SPMPM of the present invention are arranged in 3-phase as shown in FIG. 7, X-windings and Y-windings each have phases A, B, C. Electric currents provided by the servo-driver flow through the wires with a phase difference of 120° between any two phases. In the case where the electromagnetic force generated by one phase of effective wires decreases, the electromagnetic force generated by at least another phase increases, thereby the total electromagnetic force or the thrust generated by the SPMPM becomes more even. In FIG. 7, the dashed lines schematically show the magnetic flux, and arrows on each wire shows the force created by the respective wire.

Similarly, X-windings and Y-windings may also be arranged in a N-phase configuration, where N is an integer not less than 2. There is a difference of 360°/N in phase between electric currents supplied by the servo-driver for any two adjacent phases of the wires.

Although the invention has been described in detail as above, the aforementioned embodiments in the description are intended to be illustrative rather than restrictive. It should be appreciated by those skilled in the art that the present invention may be implemented in other forms without departing from the spirit or the scope of the present invention to be defined by the appended claims.

INDUSTRIAL APPLICABILITY

According to this invention, X-windings and Y-windings overlaps in the direction perpendicular to the planar magnet array, and distribute on the whole surface of the thrust core facing the planar magnet array, hence the effective wires in the X-windings and Y-windings are lengthened and increased in number, therefore the electromagnetic force generated by the SPMPM of this invention is increased correspondingly. The thrust core is made of iron material according to the invention so that the electromagnetic force generated is further increased. By providing separated anti-yawing members, interference between anti-yawing torque and the electromagnetic force for propelling is eliminated.

What is claimed is:

1. A synchronous permanent magnet planar motor, comprising:
    a stator, comprising a planar magnet array, for generating a magnetic field whose polarity periodically alternates in space;
    a mover, comprising a thrust core placed opposite the planar magnet array;
    X-windings and Y-windings, disposed on a surface of the thrust core facing the planar magnet array; and
    a servo-driver, for supplying alternating electric currents to the X-windings and Y-windings such that
    the X-windings generate electromagnetic force in X direction in cooperation with the magnetic field,
    and the Y-windings generate electromagnetic force in Y direction in cooperation with the magnetic field,
    wherein the X-windings and the Y-windings overlap in a direction perpendicular to the planar magnet array, and are arranged on the whole surface of the thrust core facing the planar magnet array.

2. The synchronous permanent magnet planar motor of claim 1, wherein, the X direction and the Y direction are parallel with the planar magnet array.

3. The synchronous permanent magnet planar motor of claim 2, wherein, the X direction is normal to the Y direction.

4. The synchronous permanent magnet planar motor of claim 3, wherein,
    on the surface of the thrust core facing the planar magnet array, there are arranged a plurality of grooves oriented in the X direction, in which are embedded effective wires of the Y-windings; and a plurality of grooves oriented in the Y direction crossing the grooves in the X direction, in which are embedded effective wires of the X-windings;
    and wherein the grooves in the X direction and in the Y direction are machined to different depths such that the X-windings and the Y-windings embedded therein overlap in a direction perpendicular to the surface.

5. The synchronous permanent magnet planar motor of claim 4, wherein, the thrust core is made of iron materials.

6. The synchronous permanent magnet planar motor of claim 1, further comprising:
    two anti-yawing windings, rigidly and symmetrically fixed on two opposite sides of the mover; wherein when the mover yaws due to disturbance, the servo-driver supplies corresponding electric currents for the two anti-yawing windings such that the two anti-yawing windings generate equal forces in opposite directions respectively, so as to exert a torque on the mover to counteract the yawing.

7. The synchronous permanent magnet planar motor of claim 1, wherein,
    the X-windings and the Y-windings are arranged in a N-phase configuration, and the servo-driver supplies alternating electric currents to different phases of wires in the X-windings and the Y-windings with a phase difference of between any two adjacent phases, where N is an integer not less than 2.

8. The synchronous permanent magnet planar motor of claim 7, wherein, N equals 3.

* * * * *

UNITED STATES PATENT AND TRADEMARK OFFICE
CERTIFICATE OF CORRECTION

PATENT NO. : 7,339,289 B2  
APPLICATION NO. : 11/207425  
DATED : March 4, 2008  
INVENTOR(S) : Jinsong Wang et al.

Page 1 of 1

It is certified that error appears in the above-identified patent and that said Letters Patent is hereby corrected as shown below:

Assignees:
Delete "(HK)" and replace with --(CN)-- the Nationality of both Tsinghua University and Shanghai MicroElectronics Equipment Co., Ltd.

Signed and Sealed this

First Day of July, 2008

JON W. DUDAS  
*Director of the United States Patent and Trademark Office*